UNITED STATES PATENT OFFICE.

LOUIS GATHMANN, OF CHICAGO, ILLINOIS.

MANUFACTURE OF PRODUCTS OF LOBATED GRAIN.

SPECIFICATION forming part of Letters Patent No. 342,249, dated May 18, 1886.

Application filed December 24, 1885. Serial No. 186,636. (No specimens.)

*To all whom it may concern:*

Be it known that I, LOUIS GATHMANN, of Chicago, in the county of Cook and State of Illinois, have invented certain new and useful Improvements in Manufacture of Products of Lobated Grain; and I do hereby declare that the following is a full, clear, and exact description thereof.

This invention relates to a new method in the manufacture of grits or coarse products of entire wheat or other lobated grains.

It has for its object to produce cut grits or coarse products of entire wheat or other lobated grains which, while containing the bran or a part thereof, shall also contain a larger proportion of the inner grain substance in the coarse fragments than such products heretofore made by the method of breaking or crushing or grinding have contained, or, in other words, to produce the grits by a method which involves the production of less flour than the methods of grinding, crushing, or breaking heretofore employed.

To this end the method or process of invention herein claimed as new consists in first splitting or cracking lobated grain, and then cutting it by means of knives into smaller fragments, as oats have been cut in the manufacture of oat-meal, instead of breaking it further by grinding or crushing.

In carrying my invention into practice the wheat or other lobated grain may be and usually will be first subjected to some process of cleaning or decortication, such as often precedes other modes of reduction. Whether thus preliminarily treated or not, the grain is subjected, as the first essential step in my process, to the action of any well-known or other approved means for splitting or coarsely breaking the same. Preferably the breaking or splitting will be done through the crease, so as to make of each lobated kernel or grain two oblong fragments, though this is not insisted upon, or, indeed, always wholly practicable. If desired, here may follow any operation of sifting or cleaning; but this, like the preliminary cleaning or decortication of the grain first mentioned, is optional, and not an essential part of my process. Whether thus or otherwise intermediately treated, the split or broken grain is next, and as a second step in my process, subjected to the action of knives or cutters—as, for example, in a machine for cutting oats in the manufacture of oat-meal. This completes the essential steps of the process; but of course there may follow this cutting an operation of bolting or dusting, or other treatment either for the removal of any dust or flour or for any other object.

It will be observed that the method above pointed out, and consisting, essentially, of the two steps of, first, coarsely breaking or splitting the lobated grain, and, second, thereafter reducing the fragments to the desired size by a cutting, as distinguished from a breaking or crushing, action, is calculated to produce the least possible amount of flour, and to therefore give a product which, with the bran present therein, also contains the largest attainable proportion of the entire inner grain-substance in the form of coarse fragments; for, in view of the lobated character of the grain to which this invention is to apply, a single coarse breaking or a splitting thereof may be effected with the detachment of but little flour, and a further reduction by cutting will be attended by the production of much less flour than will be made by any other method.

I am aware that lobated grains have been cut transversely into sections or fragments, like oats, without having been previously split through the crease or otherwise broken. I disclaim such former method and product. Among the differences between said product and that obtained by the method herein set forth is this: The previous product cut from whole grains contains those impurities which are concealed in the crease, while the product of my improved method is free from such impurities by reason of the grain having been first broken through the crease.

I claim as my invention—

The method of making grits from lobated grains, which consists, essentially, in first cracking or splitting the grain, and thereafter cutting the fragments into others of the desired size.

In testimony that I claim the foregoing as my invention I affix my signature in presence of two witnesses.

LOUIS GATHMANN.

Witnesses:
M. E. DAYTON,
C. CLARENCE POOLE.